United States Patent
Iida et al.

(10) Patent No.: US 12,015,117 B2
(45) Date of Patent: Jun. 18, 2024

(54) LITHIUM SECONDARY CELL

(71) Applicant: NGK INSULATORS, LTD., Nagoya (JP)

(72) Inventors: Daisuke Iida, Kitanagoya (JP); Eiji Nakashima, Kariya (JP); Yuuki Fujita, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 516 days.

(21) Appl. No.: 17/302,872

(22) Filed: May 14, 2021

(65) Prior Publication Data

US 2021/0265652 A1    Aug. 26, 2021

Related U.S. Application Data

(63) Continuation of application No. PCT/JP2019/048505, filed on Dec. 11, 2019.

(30) Foreign Application Priority Data

Dec. 18, 2018   (JP) ................. 2018-236548

(51) Int. Cl.
*H01M 10/0525*   (2010.01)
*H01M 4/131*   (2010.01)
(Continued)

(52) U.S. Cl.
CPC ........ *H01M 10/0525* (2013.01); *H01M 4/131* (2013.01); *H01M 10/0567* (2013.01);
(Continued)

(58) Field of Classification Search
CPC .......... H01M 10/0525; H01M 50/247; H01M 50/202; H01M 50/105; H01M 50/238
See application file for complete search history.

(56) References Cited

U.S. PATENT DOCUMENTS

| 2009/0111030 A1 | 4/2009 | Hojo et al. |
| 2010/0015514 A1 | 1/2010 | Miyagi et al. |

(Continued)

FOREIGN PATENT DOCUMENTS

| CN | 105375064 A | 3/2016 |
| CN | 105742703 A | 7/2016 |

(Continued)

OTHER PUBLICATIONS

Extended European Search Report (Application No. 19900013.4) dated Oct. 13, 2022.
(Continued)

*Primary Examiner* — Olatunji A Godo
(74) *Attorney, Agent, or Firm* — BURR PATENT LAW, PLLC

(57) ABSTRACT

A lithium secondary cell includes a positive electrode, a separator, a negative electrode, an electrolytic solution, and a cell case. The positive electrode, the negative electrode, and the separator are impregnated with the electrolytic solution. The cell case is a sheet-like member and convers the positive electrode and the negative electrode from both sides in the direction of superposition. The cell case houses therein the positive electrode, the separator, the negative electrode, and the electrolytic solution. The electrolytic solution contains an electrolytic solution material serving as a base compound and LiDFOB serving as an additive. The moisture content in the electrolytic solution is higher than or equal to 10 ppm by mass and lower than or equal to 15 ppm by mass.

7 Claims, 4 Drawing Sheets

(51) Int. Cl.
*H01M 10/0567* (2010.01)
*H01M 10/0585* (2010.01)
*H01M 50/105* (2021.01)
*H01M 50/202* (2021.01)
*H01M 50/238* (2021.01)
*H01M 50/247* (2021.01)

(52) U.S. Cl.
CPC ..... *H01M 10/0585* (2013.01); *H01M 50/105* (2021.01); *H01M 50/202* (2021.01); *H01M 50/238* (2021.01); *H01M 50/247* (2021.01)

(56) References Cited

U.S. PATENT DOCUMENTS

| | | |
|---|---|---|
| 2013/0022861 A1 | 1/2013 | Miyagi et al. |
| 2015/0194704 A1 | 7/2015 | Garsuch et al. |
| 2015/0243936 A1 | 8/2015 | Miyagi et al. |
| 2017/0040593 A1 | 2/2017 | Miyagi et al. |
| 2017/0179500 A1 | 6/2017 | Zhu et al. |
| 2017/0317334 A1 | 11/2017 | Yura et al. |
| 2018/0233745 A1* | 8/2018 | Yura ............... H01M 10/0525 |
| 2019/0252672 A1 | 8/2019 | Miyagi et al. |
| 2019/0355970 A1 | 11/2019 | Yura et al. |
| 2019/0363357 A1 | 11/2019 | Yura et al. |
| 2021/0066707 A1 | 3/2021 | Miyagi et al. |
| 2021/0184260 A1* | 6/2021 | Takahashi ......... H01M 10/0569 |

FOREIGN PATENT DOCUMENTS

| | | |
|---|---|---|
| CN | 107210427 A | 9/2017 |
| CN | 104600363 B | 2/2018 |
| CN | 104641496 B | 5/2018 |
| JP | S60-056223 B2 | 12/1985 |
| JP | H10-284056 A | 10/1998 |
| JP | 4162096 B2 | 10/2008 |
| JP | 2013-134865 A1 | 7/2013 |
| JP | 6056223 B2 | 1/2017 |
| JP | 2018-156761 A | 10/2018 |
| WO | 2018/016166 A1 | 1/2018 |
| WO | 2018/147387 A1 | 8/2018 |
| WO | 2018/155155 A1 | 8/2018 |

OTHER PUBLICATIONS

Japanese Office Action (with English translation) dated Sep. 12, 2022 (Application No. 2020-561342).

Jiho Cha, et al., "Mechanisms for Electrochemical Performance Enhancement by the Salt-Type Electrolyte Additive, Lithium Difluoro(Oxalato)Borate, in High-Voltage Lithium-Ion Batteries," *Journal of Power Sources*, 357 (2017), pp. 97-106.

International Search Report and Written Opinion (Application No. PCT/JP2019/048505) dated Mar. 3, 2020.

English translation of the International Preliminary Report on Patentability (Chapter I) dated Jul. 1, 2021 (Application No. PCT/JP2019/048505).

Taiwanese Patent Gazette dated Oct. 11, 2023 (Application No. 108145948).

Korean Office Action (Application No. 10-2021-7015207) dated Aug. 30, 2023 (with English translation) (18 pages).

Chinese Office Action (with English translation) dated Jan. 11, 2024 (Application No. 201980065756.5).

Taiwanese Office Action dated Jan. 19, 2023 (Application No. 108145948).

* cited by examiner

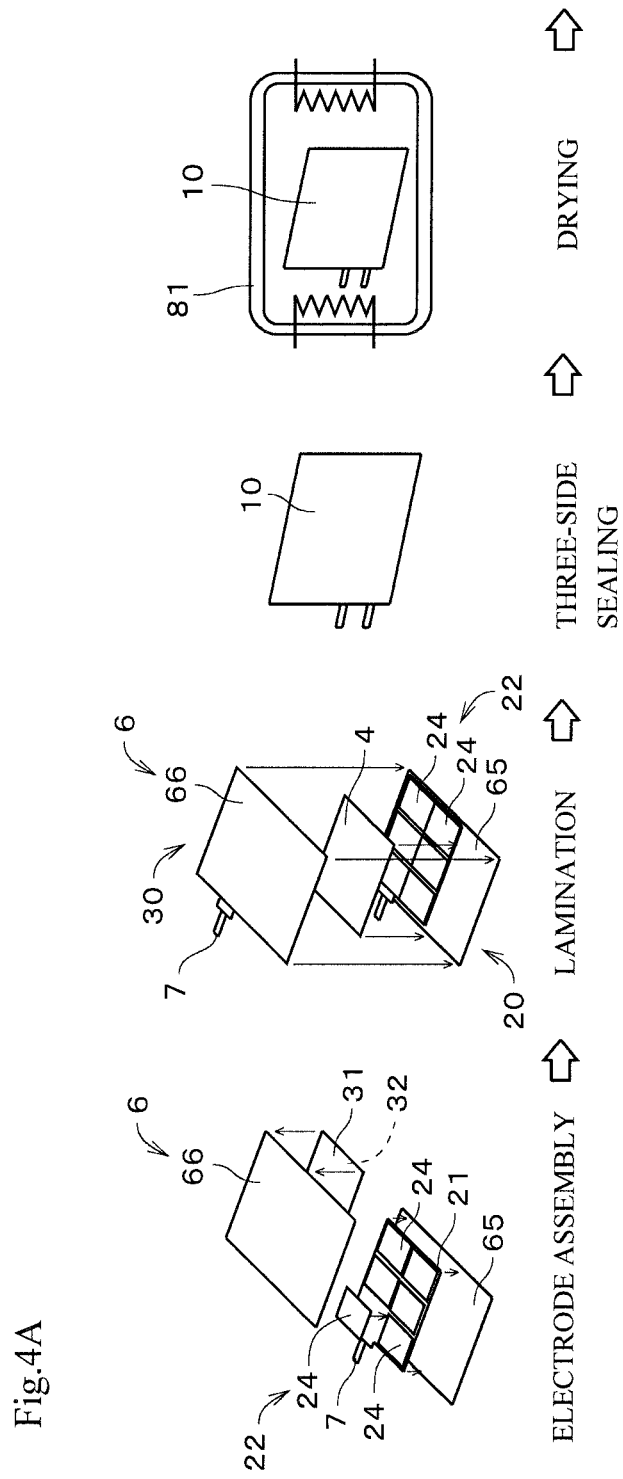

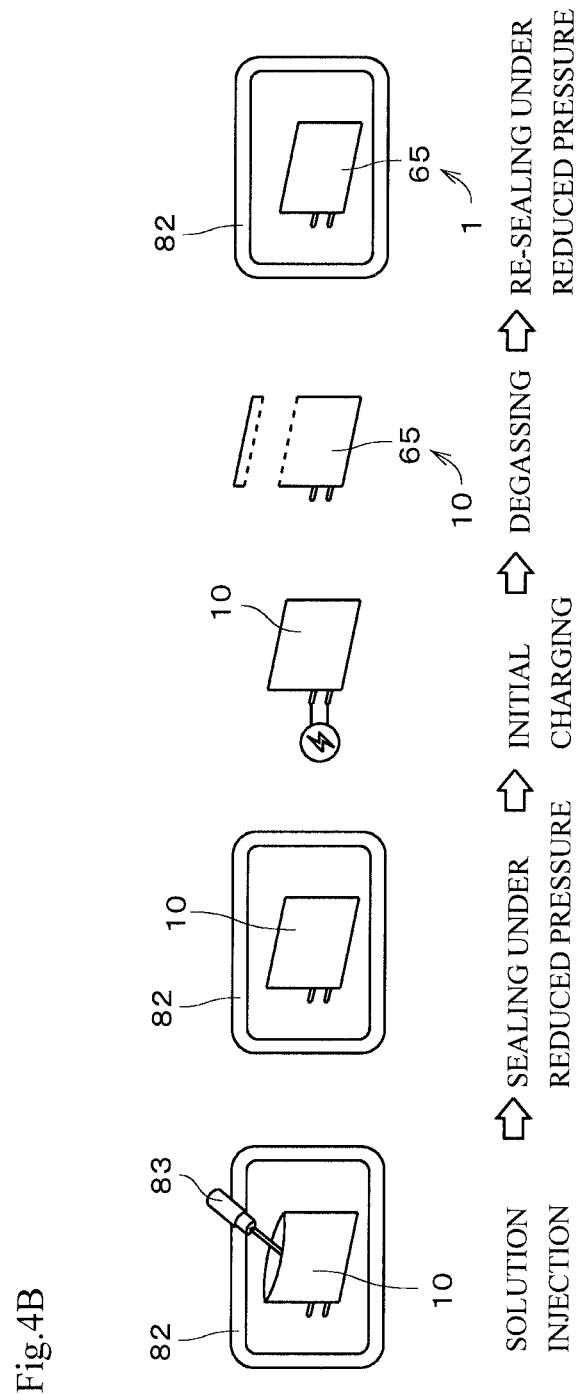

LITHIUM SECONDARY CELL

CROSS-REFERENCE TO RELATED APPLICATION

This present application is a continuation application of International Application No. PCT/JP2019/048505, filed on Dec. 11, 2019, which claims priority to Japanese Patent Application No. 2018-236548, filed Dec. 18, 2018. The contents of these application are incorporated herein by reference in their entirety.

TECHNICAL FIELD

The present invention relates to a lithium secondary cell.

BACKGROUND ART

In recent years, consideration is being given to using lithium secondary cells as power supply sources of smart cards. For example, a solution obtained by dissolving lithium phosphate hexafluoride ($LiPF_6$) in an organic solvent has been known as an electrolytic solution used in a lithium secondary cell.

"Mechanisms for electrochemical performance enhancement by the salt-type electrolyte additive, lithium difluoro (oxalato)borate, in high-voltage lithium-ion batteries" by Jiho Cha et al., Journal of Power Sources 357 (2017) 97-106 (Document 1) describes that addition of lithium difluoro (oxalato)borate (LiDFOB) to the electrolytic solution improves stability of the interface between a high-voltage Li-rich cathode and a graphite anode. Document 1 also describes that the addition of LiDFOB to electrolytic solution also suppresses degradation in cycling performance of electrodes.

Incidentally, a card with a fingerprint recognition function and a wireless communication function, which is one of smart cards, requires large-current pulse discharge from a power supply source. There is thus demand for reducing the internal resistance (in particular, reaction resistance) of a lithium secondary cell.

SUMMARY OF INVENTION

The present invention is intended for a lithium secondary cell, and it is an object of the present invention to reduce reaction resistance of the lithium secondary cell.

A lithium secondary cell according to one preferable embodiment of the present invention includes a positive electrode, a separator arranged on the positive electrode in a predetermined direction of superposition, a negative electrode arranged on the separator on a side opposite to the positive electrode in the direction of superposition, an electrolytic solution with which the positive electrode, the negative electrode, and the separator are impregnated, and a sheet-like cell case that covers the positive electrode and the negative electrode from both sides in the direction of superposition and houses therein the positive electrode, the separator, the negative electrode, and the electrolytic solution. The electrolytic solution contains an electrolytic solution material serving as a base compound, and lithium difluoro (oxalato)borate serving as an additive. The electrolytic solution has a moisture content higher than or equal to 10 ppm by mass and lower than or equal to 15 ppm by mass. Accordingly, it is possible to reduce the reaction resistance of the lithium secondary cell.

Preferably, the electrolytic solution has a content of the lithium difluoro(oxalato)borate higher than or equal to 0.1 percent by mass and lower than or equal to 4 percent by mass.

Preferably, reaction resistance per unit reaction area is higher than or equal to 3.5 $\Omega \cdot cm^2$ and lower than or equal to 5.8 $\Omega \cdot cm^2$.

Preferably, the electrolytic solution further contains fluoroethylene carbonate as an additive.

Preferably, the positive electrode includes a sheet-like current collector having conductivity, and an active material plate that is a plate-like ceramic sintered body containing a lithium composite oxide.

Preferably, the active material plate has a structure in which primary particles having a layered rock-salt structure are coupled together. The primary particles have an average inclination angle greater than 0° and less than or equal to 30°. The average inclination angle is an average value of angles formed by (003) planes of the primary particles and a main surface of the active material plate.

Preferably, the lithium secondary cell described above is used as a power supply source of a sheet-like device or a device having flexibility.

Preferably, the lithium secondary cell described above is used as a power supply source of a smart card that is the device having flexibility.

These and other objects, features, aspects and advantages of the present invention will become more apparent from the following detailed description of the present invention when taken in conjunction with the accompanying drawings.

BRIEF DESCRIPTION OF DRAWINGS

FIG. 4A is a diagram illustrating a procedure for manufacturing a lithium secondary cell; and FIG. 4B is a diagram illustrating the procedure for manufacturing a lithium secondary cell.

DESCRIPTION OF EMBODIMENTS

Figure 1:
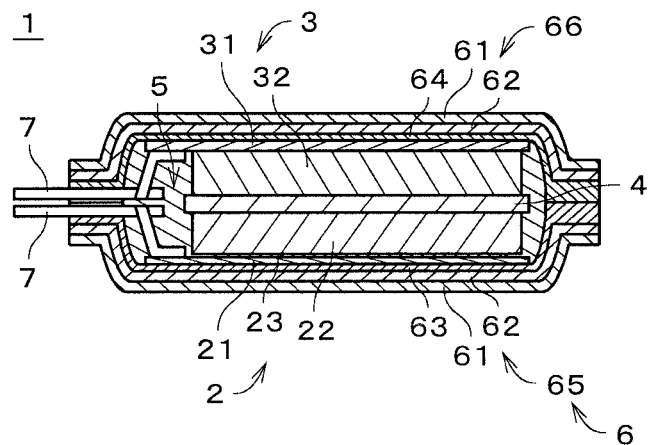
FIG. 1 is a sectional view of a lithium secondary cell according to one embodiment.
Figure 2:
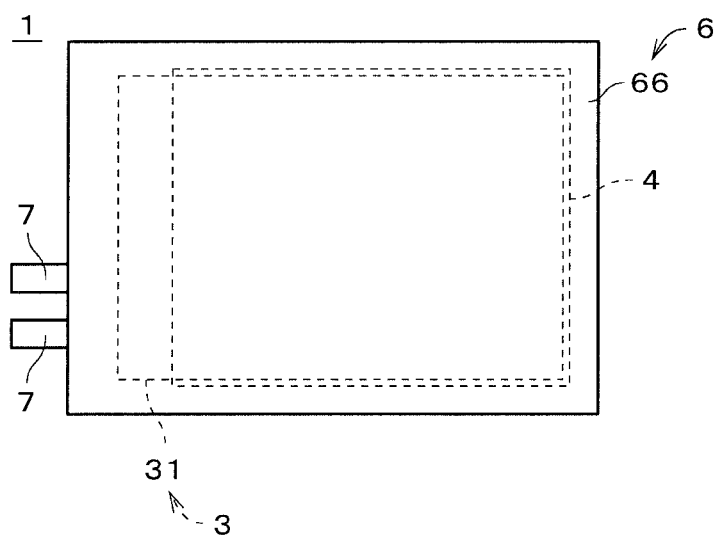
FIG. 2 is a plan view of the lithium secondary cell.

FIG. 1 is a sectional view illustrating a configuration of a lithium secondary cell 1 according to one embodiment of the present invention. FIG. 2 is a plan view of the lithium secondary cell 1. To facilitate understanding of the drawings, the lithium secondary cell 1 and its configuration are illustrated thicker in FIG. 1 than actual thicknesses. In FIG. 1, the widths of a positive electrode 2, a separator 4, and a negative electrode 3, which will be described later, in the right-left direction are also illustrated smaller than actual widths, and the width of a cell case 6 at junctions in the right-left direction (i.e., both ends in the right-left direction in FIG. 1) is also illustrated greater than an actual width. Note that part of the structure on the front and back of the section is also illustrated in FIG. 1. The same applies to FIG. 3.

The lithium secondary cell 1 is a compact and thin cell. The lithium secondary cell 1 has, for example, a generally rectangular shape in plan view. In plan view, for example, the lithium secondary cell 1 has a longitudinal length of 10 mm to 46 mm and a lateral length of 10 mm to 46 mm. The lithium secondary cell 1 has a thickness (i.e., a thickness in the up-down direction in FIG. 1) of, for example, 0.30 mm to 0.45 mm and preferably 0.40 mm to 0.45 mm. The lithium secondary cell 1 is a sheet-like member or a thin plate-like member having flexibility. The sheet-like member as used herein refers to a thin member that becomes easily deformed by a relatively small force, and is also referred to as a film-like member. The same applies to the following description.

For example, the lithium secondary cell 1 is mounted on a sheet-like device or a device having flexibility and is used as a power supply source. The sheet-like device as used herein refers to a thin device that becomes easily deformed by a relatively small force, and is also referred to as a film-like device. In the present embodiment, the lithium secondary cell 1 is built in, for example, a smart card having an arithmetic processing function and used as a power supply source of the smart card. The smart card is a card-type device having flexibility. For example, the smart card is used as a card with a fingerprint recognition function and a wireless communication function, the card including a wireless communication IC, an ASIC for fingerprint analysis, and a fingerprint sensor. In the following description, devices such as smart cards for which the lithium secondary cell 1 is used as a power supply source are also referred to as "target devices."

The lithium secondary cell 1 is mounted on a smart card by, for example, cold lamination in which pressure is applied at ordinary temperature or hot lamination in which pressure is applied with the application of heat. The processing temperature in the hot lamination is, for example, in the range of 110° C. to 260° C. The present embodiment describes the lithium secondary cell 1 that is mounted on a smart card by cold lamination.

The lithium secondary cell 1 includes the positive electrode 2, the negative electrode 3, the separator 4, an electrolytic solution 5, the cell case 6, and two terminals 7. The positive electrode 2, the separator 4, and the negative electrode 3 are superposed in a predetermined direction of superposition. In the example illustrated in FIG. 1, the positive electrode 2, the separator 4, and the negative electrode 3 are laminated in the up-down direction in the drawing. In the following description, the "upper and lower sides in FIG. 1" are simply referred to as the "upper and lower sides." The "up-down direction in FIG. 1" is simply referred to as the "up-down direction" or also referred to as the "direction of superposition." The up-down direction in FIG. 1 does not necessarily have to match an actual up-down direction when the lithium secondary cell 1 is mounted on a target device such as a smart card.

In the example illustrated in FIG. 1, the separator 4 is arranged on the upper face of the positive electrode 2 in the up-down direction (i.e., the direction of superposition). The negative electrode 3 is arranged on the upper face of the separator 4 in the up-down direction. In other words, the negative electrode 3 is arranged on the separator 4 on the side opposite to the positive electrode 2 in the up-down direction. The positive electrode 2, the separator 4, and the negative electrode 3 each have, for example, a generally rectangular shape in plan view. The positive electrode 2, the separator 4, and the negative electrode 3 have almost the same shape (i.e., almost the same form and the same dimensions) in plan view.

The cell case 6 is a sheet-like and bag-shaped member. The cell case 6 has a generally rectangular shape in plan view. The cell case 6 includes two-layer sheet portions 65 and 66 superposed in the up-down direction. In the following description, the sheet portion 65 located on the lower side of the positive electrode 2 is referred to as a "first sheet portion 65," and the sheet portion 66 located on the upper side of the negative electrode 3 is referred to as a "second sheet portion 66." The outer peripheral edge of the first sheet portion 65 and the outer peripheral edge of the second sheet portion 66 are bonded together by, for example, so-called heat seal. For example, the first sheet portion 65 and the second sheet portion 66 of the cell case 6 are each formed of a laminate film in which metal foil 61 formed of a metal such as aluminum (Al) and an insulating resin layer 62 are laminated on each other. In the first sheet portion 65 and the second sheet portion 66, the resin layer 62 is located on the inner side of the metal foil 61.

The cell case 6 covers the positive electrode 2 and the negative electrode 3 from both sides in the up-down direction. The cell case 6 houses therein the positive electrode 2, the separator 4, the negative electrode 3, and the electrolytic solution 5. The electrolytic solution 5 is continuously present around the positive electrode 2, the separator 4, and the negative electrode 3. In other words, the electrolytic solution 5 is present between the positive electrode 2 and the negative electrode 3. The positive electrode 2, the separator 4, and the negative electrode 3 are impregnated with the electrolytic solution 5. The two terminals 72 extend outward from the inside of the cell case 6. Inside the cell case 6, one of the terminals 7 is electrically connected to the positive electrode 2, and the other terminal 7 is electrically connected to the negative electrode 3.

The positive electrode 2 includes a positive current collector 21, a positive active material plate 22, and a conductive bonding layer 23. The positive current collector 21 is a sheet-like member having conductivity. The lower face of the positive current collector 21 is bonded to the resin layer 62 of the cell case 6 via a positive bonding layer 63. The positive bonding layer 63 is formed of, for example, a mixture of resins including an acid-modified polyolefin resin and an epoxy resin. The positive bonding layer 63 may be formed by any of other various materials. The positive bonding layer 63 has a thickness of, for example, 0.5 μm to 10 μm.

For example, the positive current collector 21 includes metal foil formed of a metal such as aluminum and a conductive carbon layer laminated on the upper face of the metal foil. In other words, the main surface of the positive current collector 21 that faces the positive active material plate 22 is covered with the conductive carbon layer. The aforementioned metal foil may be formed of any of various metals other than aluminum (e.g., copper, nickel, silver, gold, chromium, iron, tin, lead, tungsten, molybdenum, titanium, zinc, or an alloy containing any of these metals). Note that the aforementioned conductive carbon layer may be omitted from the positive current collector 21.

The positive active material plate 22 (i.e., the active material plate of the positive electrode 2) is a relatively thin plate-like ceramic sintered body containing a lithium composite oxide. The positive active material plate 22 is bonded to the upper face of the positive current collector 21 via the conductive bonding layer 23. The positive active material plate 22 faces the separator 4 in the up-down direction. The upper face of the positive active material plate 22 is in contact with the lower face of the separator 4. The positive active material plate 22 has a structure in which (many) primary particles are coupled together. The primary particles are composed of a lithium composite oxide having a layered rock-salt structure. The lithium composite oxide is typically an oxide expressed by the general formula: $Li_pMO_2$ (where $0.05<p<1.10$), where M is at least one of transition metals and contains one or more selected from the group consisting of cobalt (Co), nickel (Ni), and manganese (Mn). The layered rock-salt structure as used herein refers to a crystal structure in which a lithium layer and a transition metal layer other than lithium are alternately laminated one above another with an oxygen layer sandwiched therebetween. That is, the layered rock-salt structure is a crystal structure in which a transition metal ion layer and a sole lithium layer are alternately laminated via oxide ions (typically, α-NaFeO$_2$-type structure in which a transition metal and lithium are regularly arranged in the [111] axial direction of a cubic crystal rock-salt structure).

Preferable examples of the lithium composite oxide having a layered rock-salt structure include lithium cobalt oxides (Li$_p$CoO$_2$) where $1 \leq p \leq 1.1$, lithium nickel oxides (LiNiO$_2$), lithium manganese oxides (Li$_2$MnO$_3$), lithium nickel manganese oxides (Li$_p$(Ni$_{0.5}$, Mn$_{0.5}$)O$_2$), solid solutions expressed by the general formula: Li$_p$(Co$_x$, Ni$_y$, Mn$_z$)O$_2$ where $0.97 \leq p \leq 1.07$ and $x+y+z=1$, solid solutions expressed by Li$_p$(Co$_x$, Ni$_x$, Al$_z$)O$_2$ where $0.97 \leq p \leq 1.07$, $x+y+z=1$, $0<x \leq 0.25$, $0.6 \leq y \leq 0.9$, and $0<z \leq 0.1$, and solid solutions of Li$_2$MnO$_3$ and LiMO$_2$ where M is a transition metal such as Co or Ni. In particular, the lithium composite oxide is preferably a lithium cobalt oxide Li$_p$CoO$_2$ where $1 \leq p \leq 1.1$ and, for example, LiCoO$_2$ (LCO).

The positive active material plate 22 may further contain one or more of elements such as magnesium (Mg), aluminum, silicon (Si), calcium (Ca), titanium (Ti), vanadium (V), chromium (Cr), iron (Fe), copper (Cu), zinc (Zn), gallium (Ga), germanium (Ge), strontium (Sr), yttrium (Y), zirconium (Zr), niobium (Nb), molybdenum (Mo), silver (Ag), tin (Sn), antimony (Sb), tellurium (Te), barium (Ba), and bismuth (Bi). Alternatively, the positive active material plate 22 may be subjected to sputtering using gold (Au) or the like as a current-collecting assistant.

In the positive active material plate 22, for example, the aforementioned primary particles have a mean particle diameter (i.e., a primary particle diameter) less than or equal to 20 μm and preferably less than or equal to 15 μm. The primary particle diameter is also, for example, greater than or equal to 0.2 μm and preferably greater than or equal to 0.4 μm. The primary particle diameter can be measured by analyzing a scanning electron microscope (SEM) image of a section of the positive active material plate 22. Specifically, for example, the positive active material plate 22 is processed by a cross-section polisher (CP) to expose a grinded section, and this grinded section is observed with an SEM at a predetermined magnification (e.g., 1000× magnification) with a predetermined field of view (e.g., 125 μm×125 μm). At this time, the field of view is set such that 20 or more primary particles are included in the field of view. Then, for every primary particle in a resultant SEM image, the diameter of a circumscribed circle drawn from the primary particle is obtained, and an average value of the obtained diameters is assumed to be the primary particle diameter.

In the positive active material plate 22, the primary particles preferably have an average inclination angle (i.e., an average orientation angle) greater than 0° and less than or equal to 30°. The average inclination angle is also more preferably greater than or equal to 5° and less than or equal to 28° and yet more preferably greater than or equal to 10° and less than or equal to 25°. The average inclination angle is an average value of angles formed by the (003) planes of the primary particles and the main surface of the positive active material plate 22 (e.g., the lower face of the positive active material plate 22).

The inclination angles of the primary particles (i.e., the angles formed by the (003) planes of the primary particles and the main surface of the positive active material plate 22) can be measured by analyzing a section of the positive active material plate 22 by electron backscatter diffraction (EBSD). Specifically, for example, the positive active material plate 22 is processed by a cross-section polisher to expose a grinded section, and this grinded section is analyzed by EBSD at a predetermined magnification (e.g., 1000× magnification) with a predetermined field of view (e.g., 125 μm×125 μm). In a resultant EBSD image, the inclination angle of each primary particle is expressed by the shades of colors, i.e., a darker color indicates a smaller inclination angle. Then, an average value of the inclination angles of the primary particles obtained from the EBSD image is assumed to be the aforementioned average inclination angle.

Among the primary particles constituting the positive active material plate 22, the proportion of primary particles having inclination angles greater than 0° and less than or equal to 30° is preferably higher than or equal to 60%, more preferably higher than or equal to 80%, and yet more preferably higher than or equal to 90%. There are no particular limitations on the upper limit of this proportion, and the proportion may be 100%. In the aforementioned EBSD image, this proportion can be obtained by obtaining a total area of the primary particles whose inclination angles are greater than 0° and less than or equal to 30° and dividing this total area of the primary particles by a total area of all the primary particles.

The positive active material plate 22 has a porosity of, for example, 25% to 45%. The porosity of the positive active material plate 22 as used herein refers to a volume ratio of pores (including open pores and closed pores) of the positive active material plate 22. This porosity can be measured by analyzing an SEM image of a section of the positive active material plate 22. For example, the positive active material plate 22 is processed by a cross-section polisher (CP) to expose a grinded section. This grinded section is observed with an SEM at a predetermined magnification (e.g., 1000× magnification) with a predetermined field of view (e.g., 125 μm×125 μm). A resultant SEM image is analyzed to obtain the porosity (%) by dividing the total area of all the pores in the field of view by the area (cross-sectional area) of the positive active material plate 22 in the field of view and multiplying the obtained value by 100.

An average value of the diameters of the pores included in the positive active material plate 22, i.e., a mean pore diameter, is, for example, less than or equal to 15 μm, preferably less than or equal to 12 μm, and more preferably less than or equal to 10 μm. The mean pore diameter is also, for example, greater than or equal to 0.1 μm and preferably greater than or equal to 0.3 μm. The aforementioned diameters of the pores are typically the diameters of spheres when the pores are assumed to be the spheres having the same volume or the same cross-sectional area. The mean pore diameter is obtained by calculating an average value of the diameters of pores on the basis of the number of pores. The mean pore diameter can be obtained by, for example, analysis of a sectional SEM image or a known method such as mercury porosimetry. Preferably, the mean pore diameter is measured by mercury porosimetry using a mercury porosimeter.

In the example illustrated in FIG. 1, the positive active material plate 22 is a single plate-like member, but may be divided into a plurality of plate-like members (hereinafter, referred to as "active material plate elements"). In this case, each of the active material plate elements is bonded to the positive current collector 21 via the conductive bonding layer 23. For example, the active material plate elements are arranged in a matrix (i.e., in grid form) on the positive current collector 21. Each active material plate element has, for example, a generally rectangular shape in plan view. In plan view, the active material plate elements may have almost the same shape (i.e., almost the same form and almost the same dimensions), or may have different shapes. The active material plate elements are spaced from one another in plan view.

The conductive bonding layer 23 includes conductive powder and a binder. Examples of the conductive powder include powder of acetylene black, scaly natural graphite, carbon nanotubes, carbon nanofibers, carbon nanotube derivatives, and carbon nanofiber derivatives. The binder contains, for example, polyimide-amide resins. The polyimide-amide resins contained in the binder may be of one kind, or may be of two or more kinds. The binder may contain resins other than polyimide-amide resins. The conductive bonding layer 23 is formed by applying the conductive powder and the binder described above as well as a liquid or paste adhesive containing a solvent to the positive current collector 21 or the positive active material plate 22 and causing the solvent to evaporate and solidify between the positive electrode collector 21 and the positive active material plate 22.

The positive current collector 21 has a thickness of, for example, 9 µm to 50 µm, preferably 9 µm to 20 µm, and more preferably 9 µm to 15 µm. The positive active material plate 22 has a thickness of, for example, 15 µm to 200 µm, preferably 30 µm to 150 µm, and more preferably 50 µm to 100 µm. By increasing the thickness of the positive active material plate 22, it is possible to increase the capacity of the active material per unit area and to increase the energy density of the lithium secondary cell 1. By reducing the thickness of the positive active material plate 22, it is possible to suppress deterioration of cell characteristics (in particular, an increase in resistance value) accompanying the repetition of charging and discharging. The conductive bonding layer 23 has a thickness of, for example, 3 µm to 28 µm and preferably 5 µm to 25 µm.

The negative electrode 3 includes a negative current collector 31 and a negative active material layer 32. The negative current collector 31 is a sheet-like member having conductivity. The upper face of the negative current collector 31 is bonded to the cell case 6 via a negative bonding layer 64. The negative bonding layer 64 is formed of, for example, a mixture of resins including an acid-modified polyolefin resin and an epoxy resin. The negative bonding layer 64 may be formed of any of other various materials. The negative bonding layer 64 has a thickness of, for example, 0.5 µm to 10 µm.

The negative current collector 31 is, for example, metal foil formed of a metal such as copper. The metal foil may be formed of any of various metals other than copper (e.g., stainless steel, nickel, aluminum, silver, gold, chromium, iron, tin, lead, tungsten, molybdenum, titanium, zinc, or an alloy containing any of these metals).

The negative active material layer 32 includes a binder composed primarily of resin and a carbonaceous material serving as a negative active material. The negative active material layer 32 is applied as a coat to the lower face of the negative current collector 31. That is, the negative electrode 3 is a so-called coating electrode. The negative active material layer 32 faces the separator 4 in the up-down direction. The lower face of the negative active material layer 32 is in contact with the upper face of the separator 4.

Examples of the aforementioned carbonaceous material of the negative active material layer 32 include graphite (natural graphite or artificial graphite), pyrolytic carbon, coke, resin fired bodies, mesophase microspheres, and mesosphere pitches. The negative electrode 3 may use a lithium-occluding substance as the negative active material, instead of the carbonaceous material. Examples of the lithium-occluding substance include silicon, aluminum, tin, iron, iridium, an alloy containing any of the aforementioned materials, an oxide containing any of the aforementioned materials, and a fluoride containing any of the aforementioned materials. The binder may be made of, for example, styrene-butadiene rubber (SBR), polyvinylidene fluoride (PVDF), or a mixture of these materials. In the present embodiment, PVDF is used as the binder.

The negative current collector 31 has a thickness of, for example, 5 µm to 25 µm, preferably 8 µm to 20 µm, and more preferably 8 µm to 15 µm. The negative active material layer 32 has a thickness of, for example, 20 µm to 300 µm, preferably 30 µm to 250 µm, and more preferably 30 µm to 150 µm. By increasing the thickness of the negative active material layer 32, it is possible to increase the capacity of the active material per unit area and to increase the energy density of the lithium secondary cell 1. By reducing the thickness of the negative active material layer 32, it is possible to suppress deterioration of cell characteristics (in particular, an increase in resistance value) accompanying the repetition of charging and discharging.

Figure 3:
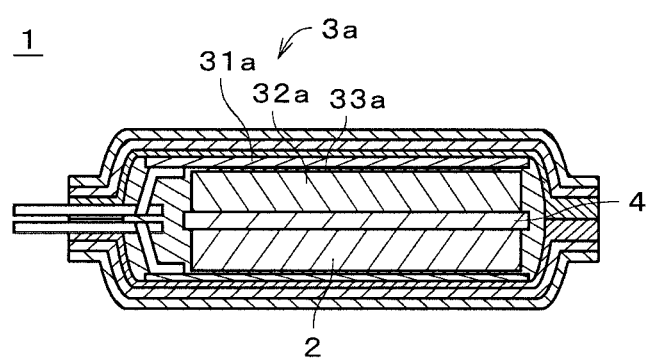
FIG. 3 is a sectional view of another lithium secondary cell.

The lithium secondary cell 1 may include a negative electrode 3a having a structure different from the structure of the negative electrode 3 as illustrated in FIG. 3, instead of the negative electrode 3 serving as a coating electrode. The negative electrode 3a has almost the same structure as the positive electrode 2 described above. Specifically, the negative electrode 3a includes a negative current collector 31a, a negative active material plate 32a, and a conductive bonding layer 33a. The negative current collector 31a is a sheet-like member having conductivity. For example, the negative current collector 31a is a member formed of a material similar to that of the negative current collector 31 described above and having the same structure as the negative current collector 31.

The negative active material plate 32a (i.e., the active material plate of the negative electrode 3a) is a relatively thin plate-like ceramic sintered body that contains a lithium composite oxide (e.g., lithium titanium oxide (LTO)). The negative active material plate 32a is bonded to the lower face of the negative current collector 31a via the conductive bonding layer 33a. For example, the conductive bonding layer 33a is formed of a material similar to that of the conductive bonding layer 23 of the positive electrode 2 described above. The negative active material plate 32a faces the separator 4 in the up-down direction. The lower face of the negative active material plate 32a is in contact with the upper face of the separator 4.

The negative current collector 31a has a thickness of, for example, 5 µm to 25 µm, preferably 8 µm to 20 µm, and more preferably 8 µm to 15 µm. The negative active material plate 32a has a thickness of, for example, 10 µm to 300 µm, preferably 30 µm to 200 µm, and more preferably 30 µm to 150 µm. By increasing the thickness of the negative active material plate 32a, it is possible to increase the capacity of the active material per unit area and to increase the energy density of the lithium secondary cell 1. By reducing the thickness of the negative active material plate 32a, it is possible to suppress deterioration of cell characteristics (in particular, an increase in resistance value) accompanying the repetition of charging and discharging. The conductive bonding layer 33a has a thickness of, for example, 3 µm to 30 µm and preferably 5 µm to 25 µm.

In the example illustrated in FIG. 3, the negative active material plate 32a is a single plate-like member, but may be divided into a plurality of plate-like members (hereinafter, referred to as "active material plate elements"). In this case, each of the active material plate elements is bonded to the negative current collector 31a via the conductive bonding layer 33a. For example, the active material plate elements are arranged in a matrix (i.e., in grid form) on the negative current collector 31a. Each active material plate element has, for example, a generally rectangular shape in plan view. In plan view, the active material plate elements may have almost the same shape (i.e., almost the same form and almost the same dimensions), or may have different shapes. The active material plate elements are spaced from one another in plan view.

In the lithium secondary cell 1 illustrated in FIGS. 1 and 3, the electrolytic solution 5 contains an electrolytic solution material serving as a base compound, and lithium difluoro(oxalato)borate (LiDFOB) serving as an additive. The electrolytic solution material is, for example, a solution obtained by dissolving lithium phosphate hexafluoride ($LiPF_6$) serving as a solute in an organic solvent. Examples of the organic solvent include a mixed solvent of ethylene carbonate (EC) and ethyl methyl carbonate (EMC), a mixed solvent of EC and methyl ethyl carbonate (MEC), and a mixed solvent of EC and diethyl carbonate (DEC). The organic solvent may be any one sole solvent among the solvents described above. The organic solvent may contain substances other than those described above. In the present embodiment, the organic solvent is a mixed solvent of EC and EMC. The volume ratio of EC and EMC in the organic solvent is, for example, in the range of 8:2 to 2:8 and preferably in the range of 3:7 to 5:5. In the present embodiment, the volume ratio of EC and EMC is 3:7.

The electrolytic solution 5 has an $LiPF_6$ concentration of, for example, 0.8 mol/L to 2.0 mol/L, preferably 0.8 mol/L to 1.5 mol/L, more preferably 1.0 mol/L to 1.5 mol/L, and yet more preferably 1.0 mol/L to 1.2 mol/L. Note that the electrolytic solution material for the electrolytic solution 5 may be modified in various ways. For example, the solute that is dissolved in the organic solvent may be lithium borofluoride ($LiBF_4$).

The aforementioned additive, i.e., LiDFOB, is also called LiODFB and expressed by the molecular formula: $LiF_2BC_2O_4$. The LiDFOB content in the electrolytic solution 5 is, for example, higher than or equal to 0.01 mass %, preferably higher than or equal to 0.05 mass %, and more preferably higher than or equal to 0.1 mass %. The LiDFOB content in the electrolytic solution 5 is also, for example, lower than or equal to 10.0 mass %, preferably lower than or equal to 5.0 mass %, and more preferably lower than or equal to 4.0 mass %.

The electrolytic solution 5 may further contain other additives, in addition to LiDFOB. One example of the other additives is fluoroethylene carbonate (FEC). FEC has excellent heat resistance. Therefore, the inclusion of FEC in the electrolytic solution 5 forms an SEI film with excellent heat resistance on the surface of the negative electrode 3 and further improves the heat resistance of the lithium secondary cell 1. Another example of the other additives described above is vinylene carbonate (VC). Because VC also has excellent heat resistance, the inclusion of VC in the electrolytic solution 5 further improves the heat resistance of the lithium secondary cell 1.

The electrolytic solution 5 contains a slight amount of moisture. The moisture content in the electrolytic solution 5 is, for example, lower than or equal to 30 ppm by mass, preferably lower than or equal to 20 ppm by mass, and more preferably lower than or equal to 15 ppm by mass. The moisture content in the electrolytic solution 5 is also, for example, higher than or equal to 10 ppm by mass and preferably higher than or equal to 11 ppm by mass.

The separator 4 is a sheet-like member or a thin plate-like insulating member. For example, the separator 4 is a single-layer separator formed of resin. Examples of the resin include polyimide, polyethylene, polyester (e.g., polyethylene terephthalate (PET)), and polypropylene. In the present embodiment, the separator 4 is primarily made of polypropylene. For example, the separator 4 has a thickness greater than or equal to 8 µm, preferably greater than or equal to 10 µm, and more preferably greater than or equal to 15 µm. The thickness of the separator 4 is also, for example, less than or equal to 30 µm, preferably less than or equal to 28 µm, and more preferably less than or equal to 25 µm.

Note that the separator 4 may be a two-layer separator in which a resin layer is laminated on a ceramic substrate. Alternatively, the separator 4 may be a two-layer separator in which a resin layer serving as a substrate is coated with ceramic. The separator 4 may have a multilayer structure including three or more layers. For example, the separator 4 may be a three-layer separator in which a resin layer is formed on each of the upper and lower surfaces of a ceramic substrate.

The use of the electrolytic solution 5 described above allows the lithium secondary cell 1 to achieve low internal resistance (in particular, reaction resistance). The reaction resistance as used herein refers to the diameter in the real axial direction of an arc component in the Cole-Cole plot obtained from an AC impedance test, and this diameter almost matches the resistance value at 10 Hz. The reaction resistance (i.e., resistance at 10 Hz measured by an AC impedance method) per unit reaction area of the lithium secondary cell 1 is, for example, lower than or equal to 5.8 ohm-square centimeters ($SI·cm^2$), preferably lower than or equal to 5.5 $\Omega·cm^2$, and more preferably lower than or equal to 5.0 $\Omega·cm^2$. The reaction resistance per unit reaction area is also, for example, higher than or equal to 3.5 $\Omega·cm^2$, preferably higher than or equal to 3.8 $\Omega·cm^2$, and more preferably higher than or equal to 4.0 $\Omega·cm^2$. Note that the reaction area described above refers to the area of a portion of one of the positive active material plate 22 and the negative active material layer 32 that faces the other material plate. In other words, the reaction area is the area of overlap between the positive active material plate 22 and the negative active material layer 32 in plan view.

Next, one example of the procedure for manufacturing the lithium secondary cell 1 will be described with reference to FIGS. 4A and 4B. First, two aluminum laminate films (with a three-layer structure including a polypropylene film, aluminum foil, and a nylon film and a thickness of 61 µm, produced by SHOWA DENKO K.K.) are prepared as the first sheet portion 65 and the second sheet portion 66 of the cell case 6. Also, the positive active material plate 22 is prepared. The positive active material plate 22 is formed by sintering an $LiCoO_2$ green sheet. In the example illustrated in FIG. 4A, the positive active material plate 22 includes a plurality of active material plate elements 24. Note that even when the positive active material plate 22 is an integral member (i.e., a single plate), the manufacturing method described below remains almost unchanged.

The LiCoO$_2$ green sheet is prepared as follows. First, Co$_3$O$_4$ powder (produced by Seido Chemical Industry Co., Ltd.) and Li$_2$CO$_3$ powder (produced by Honjo Chemical Corporation) are weighed and mixed so as to have an Li/Co molar ratio of 1.01, and then resultant mixed powder is held at 780° C. for five hours. Then, resultant powder is pulverized and cracked into particles with D50 of 0.4 μm in terms of volume in a pot mill so as to obtain powder of LiCoO$_2$ plate-like particles.

Then, 100 parts by weight of the resultant LiCoO$_2$ powder, 100 parts by weight of a dispersion medium (toluene/isopropanol ratio of 1:1), 10 parts by weight of a binder (polyvinyl butyral: product number BM-2, produced by Sekisui Chemical Co., Ltd.), 4 parts by weight of a plasticizer (DOP: Di(2-ethylhexyl)phthalate, produced by Kurogane Kasei Co., Ltd.), and 2 parts by weight of a dispersant (product name: RHEODOL SP-030, produced by Kao Corporation) are mixed. A resultant mixture is stirred and deaerated under a reduced pressure and adjusted to have a viscosity of 4000 cP, so that LiCoO$_2$ slurry is prepared. The viscosity is measured using an LVT type viscometer manufactured by AMETEK Brookfield, Inc. The slurry prepared in this way is molded in sheet form on a polyethylene terephthalate (PET) film by doctor blading so as to form the LiCoO$_2$ green sheet. The LiCoO$_2$ green sheet has a thickness of 98 μm after drying.

Next, the LiCoO$_2$ green sheet delaminated from the PET film is cut out into a piece measuring 50 mm per side by a cutter knife and placed on the center of a setter made of magnesia and serving as a lower setter (dimensions: 90 mm per side and a height of 1 mm). On the LiCoO$_2$ green sheet, a porous magnesia setter is also placed as an upper setter. The LiCoO$_2$ green sheet, sandwiched between the setters, is placed in an alumina sheath with 120 mm per side (produced by Nikkato Corporation). At this time, the alumina sheath is not hermetically sealed and is covered with a lid while leaving a clearance of 0.5 mm. A resultant laminate is fired by increasing the temperature of the laminate up to 600° C. at 200° C./h and degreasing the laminate for three hours and then by increasing the temperature of the laminate up to 870° C. at 200° C./h and holding the laminate for 20 hours. After the firing, the temperature is reduced down to an ambient temperature, and a fired body is taken out of the alumina sheath. In this way, an LiCoO$_2$ sintered plate with a thickness of 90 μm is obtained. The obtained LiCoO$_2$ sintered plate is cut out into rectangular pieces with dimensions of 10.5 mm×9.5 mm by a laser beam machine so as to obtain a plurality of active material plate elements 24 (i.e., the positive active material plate 22).

When the positive active material plate 22 has been prepared, acetylene black is mixed into a solution obtained by dissolving polyamide-imide (PAI) in N-methylpyrrolidone so as to prepare slurry, and 2 microliters (μL) of this slurry is dropped on the positive current collector 21 (aluminum foil with a thickness of 9 μm) so as to form the conductive bonding layer 23. Then, the positive active material plate 22 is placed and dried on the conductive bonding layer 23. In the example illustrated in FIG. 4A, the positive active material plate 22 including the active material plate elements 24 is bonded to the positive current collector 21 via the conductive bonding layer 23. Thereafter, a composite of the positive current collector 21 and the positive active material plate 22 (i.e., the active material plate elements 24) is laminated on the first sheet portion 65 and bonded to the first sheet portion 65 via the positive bonding layer 63 so as to form a positive electrode assembly 20. Note that one of the terminals 7 has one end fixed to the positive current collector 21 in advance by welding.

On the other hand, the negative current collector 31 (copper foil with a thickness of 10 μm) is coated with the negative active material layer 32 (a carbon layer with a thickness of 130 μm). The negative active material layer 32 is a carbon coating film that includes a mixture of graphite serving as an active material and PVDF serving as a binder. Then, a composite of the negative current collector 31 and the negative active material layer 32 is laminated on the second sheet portion 66 and bonded to the second sheet portion 66 via the negative bonding layer 64 so as to form a negative electrode assembly 30. Note that one of the terminals 7 has one end fixed to the negative current collector 31 in advance by welding.

As the separator 4, a porous polyolefin film (CELGARD #2500) is prepared. Then, an intermediate laminate 10 is formed by laminating the positive electrode assembly 20, the separator 4, and the negative electrode assembly 30 in order such that the positive active material plate 22 and the negative active material layer 32 face the separator 4. In the intermediate laminate 10, both of the upper and lower surfaces are covered with the cell case 6 (i.e., the first sheet portion 65 and the second sheet portion 66), and the first sheet portion 65 and the second sheet portion 66 extend around the positive electrode assembly 20, the separator 4, and the negative electrode assembly 30. The positive electrode assembly 20, the separator 4, and the negative electrode assembly 30 (hereinafter, also collectively referred to as a "cell element 15") have a thickness of 0.33 mm in the up-down direction. In plan view, the cell element 15 has a generally rectangular shape with dimensions of 2.3 cm×3.2 cm.

Then, three of the four sides of the generally rectangular intermediate laminate 10 are bonded and sealed by heat seal. In the example illustrated in FIG. 4A, three sides except one side on the upper side in the drawing are sealed. These three sides include one side on which the two terminals 7 protrude. To seal the three sides, a pressing jig adjusted to have a sealing width of 2 mm is used, and the outer peripheral portion of the intermediate laminate 10 is heated at 200° C. and pressurized with a pressure of 1.5 megapascals (MPa) for 10 seconds. Accordingly, the first sheet portion 65 and the second sheet portion 66 are bonded together by heat seal. After the sealing of these three sides, the intermediate laminate 10 is placed in a vacuum drier 81 in order to remove moisture and dry the adhesives (i.e., the positive bonding layer 63, the negative bonding layer 64, and the conductive bonding layer 23).

Next, the intermediate laminate 10 is placed in a glove box 82 as illustrated in FIG. 4B. Then, on the one side of the intermediate laminate 10 that is not sealed, an impregnator 83 is inserted between the first sheet portion 65 and the second sheet portion 66, and the electrolytic solution 5 is injected into the intermediate laminate 10 through the impregnator 83. The electrolytic solution 5 is a liquid obtained by dissolving LiPF$_6$ in a mixed solvent that contains EC and EMC in a volume ratio of 3:7 so as to have a concentration of 1 mol/L and by adding a predetermined amount of LiDFOB with a moisture content of 50 ppm as an additive. In Examples 1 to 3 and Comparative Examples 1 to 3 described below, the amount of LiDFOB to be added varies in the range of 1.0 mass % to 4.0 mass %. In Example 4 and Comparative Example 4, the amount of LiDFOB to be added is 1.0 mass %, and in addition to LiDFOB, 1.0 mass % of FEC is also added as an additive to the electrolytic solution 5.

When the injection of the electrolytic solution 5 has ended, the aforementioned one side that is not sealed is tentatively sealed with a simple sealer in a reduced atmosphere with an absolute pressure of 5 kPa in the glove box 82 (i.e., sealing under reduced pressure). Then, the intermediate laminate 10 is initially charged and aged for 7 days. After the aging is completed, portions of the first sheet portion 65 and the second sheet portion 66 that are in the vicinity of the outer edge of the tentatively sealed one side (i.e., the end that does not contain the cell element 15) are removed to remove gases including moisture or the like generated by the aging (i.e., degassing).

After the degassing is completed, the side formed by the aforementioned removal is bonded and sealed by heat seal in a reduced atmosphere with an absolute pressure of 5 kPa in the glove box 82. As in the case of the aforementioned sealing of the three sides, a pressing jig adjusted to have a sealing width of 2 mm is used in this sealing, and the first sheet portion 65 and the second sheet portion 66 are heated at 200° C. and pressurized with a pressure of 1.5 MPa for 10 seconds. Accordingly, the first sheet portion 65 and the second sheet portion 66 of the cell case 6 are bonded together by heat seal, and the lithium secondary cell 1 is formed. Thereafter, redundant outer peripheral portions of the cell case 6 are removed to adjust the shape of the lithium secondary cell 1. In plan view, the lithium secondary cell 1 has a rectangular shape with dimensions of 38 mm×27 mm and has a thickness less than or equal to 0.45 mm and a capacity of 30 mAh.

In the lithium secondary cell 1 manufactured by the aforementioned manufacturing method, the primary particles in the positive active material plate 22 (i.e., $LiCoO_2$ sintered plate) have an average orientation angle of 16°. This average orientation angle is measured as follows. First, the $LiCoO_2$ sintered plate described above is grinded by a cross-section polisher (CP) (IB-15000CP produced by JEOL Ltd.), and a resultant section (i.e., a section perpendicular to the main surface of the $LiCoO_2$ sintered plate) is measured by EBSD at a 1000× magnification with a field of view of 125 μm×125 μm so as to obtain an EBSD image. This EBSD measurement is conducted using a Schottky field emission scanning electron microscope (model: JSM-7800F produced by JEOL Ltd.). Then, for every particle identified in the resultant EBSD image, the angle formed by the (003) plane of the primary particle and the main surface of the $LiCoO_2$ sintered plate (i.e., the inclination of crystal orientation from the (003) plane) is obtained as an inclination angle, and an average value of these inclination angles is assumed to be the average orientation angle of the primary particles.

As described above, the $LiCoO_2$ sintered plate has a plate thickness of 90 μm. This plate thickness is measured by grinding the $LiCoO_2$ sintered plate using a cross-section polisher (CP) (IB-15000CP produced by JEOL Ltd.) and observing a resultant section by SEM (JSM6390LA produced by JEOL Ltd.). Note that the aforementioned thickness of the $LiCoO_2$ green sheet after drying is also measured in the same manner.

The $LiCoO_2$ sintered plate has a porosity of 30%. This porosity is measured as follows. The $LiCoO_2$ sintered plate is grinded by a cross-section polisher (CP) (IB-15000CP produced by JEOL Ltd.), and a resultant section is observed at a 1000× magnification with a field of view of 125 μm×125 μm by SEM (JSM6390LA produced by JEOL Ltd.). A resultant SEM image is subjected to image analysis, and the porosity (%) is calculated by dividing a total area of all the pores by the area of the $LiCoO_2$ sintered plate and multiplying the obtained value by 100.

The $LiCoO_2$ sintered plate has a mean pore diameter of 0.8 μm. This mean pore diameter is measured by mercury porosimetry using a mercury porosimeter (AutoPore IV9510 produced by Shimadzu Corporation).

Next, the relationship of the moisture content in the electrolytic solution 5 and the reaction resistance of the lithium secondary cell 1 per unit reaction area will be described with reference to Table 1.

TABLE 1

| | Additive | | Moisture | Reaction Resistance |
| --- | --- | --- | --- | --- |
| | Type | Dosage (mass %) | Content (mass %) | (10 Hz) ($\Omega \cdot cm^2$) |
| Example 1 | LIDFOB | 1.0 | 11 | 5.75 |
| Example 2 | LIDFOB | 2.0 | 12 | 5.21 |
| Example 3 | LiDFOB | 4.0 | 14 | 4.82 |
| Example 4 | LIDFOB + FEC | 1.0 1.0 | 11 | 4.68 |
| Comparative Example 1 | LIDFOB | 1.0 | 20 | 5.93 |
| Comparative Example 2 | LiDFOB | 2.0 | 30 | 5.48 |
| Comparative Example 3 | LiDFOB | 4.0 | 50 | 5.24 |
| Comparative Example 4 | LIDFOB + FEC | 1.0 1.0 | 25 | 5.09 |

Reaction Resistance in the table indicates the reaction resistance of the lithium secondary cell 1 per unit reaction area (i.e., resistance at 10 Hz, measured by the AC impedance method). The reaction resistance per unit reaction area (hereinafter, also simply referred to as "reaction resistance") is obtained by conducting a measurement at a battery voltage of 3.8V by the AC impedance method using VMP-300 produced by Bio-Logic Ltd. and reading the resistance value ($\Omega \cdot cm^2$) at 10 Hz from a resultant Cole-Cole plot. This measurement was conducted with an amplitude of 2 mV and a measuring frequency of 250 kHz to 200 mHz.

Moisture Content in the table indicates the moisture content in the electrolytic solution 5 of the lithium secondary cell 1. The moisture content is measured by decomposing the lithium secondary cell 1 after the aforementioned measurement of the reaction resistance, using a moisture measuring device CA-200/KF200 produced by Mitsubishi Chemical Analytech, Co., Ltd. In order to also measure the moisture in the electrolytic solution 5 with which the cell element 15 (i.e., the positive electrode 2, the separator 4, and the negative electrode 3) is impregnated, not only the electrolytic solution 5 but also the cell element 15 were included in the target to be measured.

In the lithium secondary cell 1 of Example 1, LiDFOB with a moisture content of 50 ppm was added to the electrolytic solution 5 so that the LiDFOB concentration became 1.0 mass %.

In the lithium secondary cell 1 of Example 2, LiDFOB with a moisture content of 50 ppm was added to the electrolytic solution 5 so that the LiDFOB concentration became 2.0 mass %.

In the lithium secondary cell 1 of Example 3, LiDFOB with a moisture content of 50 ppm was added to the electrolytic solution 5 so that the LiDFOB concentration became 4.0 mass %.

In the lithium secondary cell 1 of Example 4, LiDFOB with a moisture content of 50 ppm was added to the electrolytic solution 5 so that the LiDFOB concentration became 1.0 mass %, and FEC was further added to the electrolytic solution 5 so that the FEC concentration became 1.0 mass %.

In the lithium secondary cell 1 of Comparative Example 1, LiDFOB with a moisture content of 1000 ppm was added to the electrolytic solution 5 so that the LiDFOB concentration became 1.0 mass %.

In the lithium secondary cell 1 of Comparative Example 2, LiDFOB with a moisture content of 1000 ppm was added to the electrolytic solution 5 so that the LiDFOB concentration became 2.0 mass %.

In the lithium secondary cell 1 of Comparative Example 3, LiDFOB with a moisture content of 1000 ppm was added to the electrolytic solution 5 so that the LiDFOB concentration became 4.0 mass %.

In the lithium secondary cell 1 of Comparative Example 4, LiDFOB with a moisture content of 1000 ppm was added to the electrolytic solution 5 so that the LiDFOB concentration became 1.0 mass %, and FEC was further added to the electrolytic solution 5 so that the FEC concentration became 1.0 mass %.

In Examples 1 to 4, the moisture content in the electrolytic solution 5 was in the range of 11 ppm by mass to 14 ppm by mass. The reaction resistance of the lithium secondary cell 1 per unit reaction area was in the range of 4.68 $\Omega \cdot cm^2$ to 5.75 $\Omega \cdot cm^2$. In Comparative Examples 1 to 4, on the other hand, the moisture content in the electrolytic solution 5 was in the range of 20 ppm by mass to 50 ppm by mass. The reaction resistance of the lithium secondary cell 1 per unit reaction area was in the range of 5.09 $\Omega \cdot cm^2$ to 5.93 $\Omega \cdot cm^2$. It can be seen from Examples 1 to 4 and Comparative Examples 1 to 4 that when the moisture content in the electrolytic solution 5 is higher than or equal to 11 ppm by mass and lower than or equal to 14 ppm by mass, the reaction resistance of the lithium secondary cell 1 per unit reaction area is reduced.

As described above, the lithium secondary cell 1 includes the positive electrode 2, the separator 4, the negative electrode 3, the electrolytic solution 5, and the cell case 6. The separator 4 is arranged on the positive electrode 2 in a predetermined direction of superposition. The negative electrode 3 is arranged on the separator 4 on the side opposite to the positive electrode 2 in the direction of superposition. The positive electrode 2, the negative electrode 3, and the separator 4 are impregnated with the electrolytic solution 5. The cell case 6 is a sheet-like member and covers the positive electrode 2 and the negative electrode 3 from both sides in the direction of superposition described above. The cell case 6 houses therein the positive electrode 2, the separator 4, the negative electrode 3, and the electrolytic solution 5. The electrolytic solution 5 contains an electrolytic solution material serving as a base compound and LiDFOB serving as an additive. The moisture content in the electrolytic solution 5 is higher than or equal to 10 ppm by mass and lower than or equal to 15 ppm by mass.

The inclusion of LiDFOB in the electrolytic solution 5 can reduce the reaction resistance of the lithium secondary cell 1. The reaction resistance of the lithium secondary cell 1 can be further reduced by making the moisture content in the electrolytic solution 5 lower than or equal to 15 ppm by mass. On the other hand, by making the moisture content in the electrolytic solution 5 higher than or equal to 10 ppm by mass, it is possible to suppress an increase in time required for moisture removal in the process of manufacturing the lithium secondary cell 1. Accordingly, it is possible to prevent an excessive increase in time required for aging and to prevent deterioration in cell characteristics caused by excessive aging.

In this way, the lithium secondary cell 1 is thin, but can achieve a reduction in resistance. Accordingly, the lithium secondary cell 1 is particularly suitable for use as a power supply source of a thin device (i.e., a sheet-like device or a device having flexibility such as a smart card) that requires a reduction in resistance for, for example, large-current pulse discharge.

In the lithium secondary cell 1, the LiDFOB content in the electrolytic solution 5 is preferably higher than or equal to 0.1 mass % and lower than or equal to 4.0 mass %. By making the LiDFOB content higher than or equal to 0.1 mass %, it is possible to favorably reduce the reaction resistance of the lithium secondary cell 1. Moreover, it is possible to suppress an increase in the amount of moisture in the electrolytic solution 5 by making the LiDFOB content lower than or equal to 4.0 mass %.

In the lithium secondary cell 1, the reaction resistance per unit reaction area is preferably higher than or equal to 3.5 $\Omega \cdot cm^2$ and lower than or equal to 5.8 $\Omega \cdot cm^2$. In this way, the lithium secondary cell 1 suitable for large-current pulse discharge can be provided by reducing reaction resistance.

In the lithium secondary cell 1, the electrolytic solution 5 preferably further contains FEC as an additive. In this case, as shown Example 4, the reaction resistance of the lithium secondary cell 1 can be reduced more than in Examples 2 and 3.

As described above, the positive electrode 2 preferably includes a sheet-like current collector having conductivity (i.e., the positive current collector 21) and an active material plate that is a plate-like ceramic sintered body containing a lithium composite oxide (i.e., positive active material plate 22). This further reduces the reaction resistance of the lithium secondary cell 1.

More preferably, the positive active material plate 22 of the positive electrode 2 has a structure in which primary particles having a layered rock-salt structure are coupled together. These primary particles preferably have an average inclination angle greater than 0° and less than or equal to 30°. The average inclination angle is the average value of the angles formed by the (003) planes of the primary particles and the main surface of the positive active material plate 22. This reduces a situation where the internal stress of the positive active material plate 22 generated by expansion and contraction of crystal lattices accompanying the cycle of charging and discharging is applied to the main surface of the positive active material plate 22 that faces the conductive bonding layer 23 and the positive current collector 21.

In this way, the internal stress generated by the expansion and contraction of crystal lattices is made less likely to be applied to the main surface of the positive active material plate 22 that comes in contact with the conductive bonding layer 23. This suppresses a reduction in the strength of bonding between the positive active material plate 22 and the positive current collector 21. As a result, it is possible to improve the stability of voltage during charging and discharging of the lithium secondary cell 1.

The lithium secondary cell 1 described above may be modified in various ways.

For example, the LiDFOB content in the electrolytic solution 5 may be lower than 0.1 mass %, or may be higher than 4.0 mass %. The reaction resistance of the lithium secondary cell 1 per unit reaction area may be lower than 3.5 $\Omega \cdot cm^2$, or may be higher than 5.8 $\Omega \cdot cm^2$.

The structure of the positive active material plate 22 of the positive electrode 2 may be modified in various ways. For example, the average inclination angle of the primary particles with a layered rock-salt structure in the positive active material plate 22 may be greater than 30° or may be 0°. Alternatively, the primary particles may have a structure other than the layered rock-salt structure.

The positive electrode 2 may be a coating electrode in which the positive current collector 21 is coated with a positive active material that contains a binder composed primary of resin and a positive active material layer.

The lithium secondary cell 1 may be used as a power supply source of a device having flexibility other than a smart card (e.g., card-type device) or a sheet-like device (e.g., a wearable device provided on clothes or the like or a body-mounted device). The lithium secondary cell 1 may also be used as a power supply source of any of various targets (e.g., an IoT module) other than the devices described above.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

INDUSTRIAL APPLICABILITY

The lithium secondary cell according to the present invention is applicable in various fields such as a field in which lithium secondary cells are used as power supply sources of smart cards having an arithmetic processing function.

REFERENCE SIGNS LIST

1 Lithium secondary cell
2 Positive electrode
3, 3a Negative electrode
4 Separator
5 Electrolytic solution
6 Cell case
21 Positive current collector
22 Positive active material plate

The invention claimed is:

1. A lithium secondary cell comprising:
a positive electrode;
a separator arranged on said positive electrode in a predetermined direction of superposition;
a negative electrode arranged on said separator on a side opposite to said positive electrode in said direction of superposition;
an electrolytic solution with which said positive electrode, said negative electrode, and said separator are impregnated; and
a sheet-like cell case that covers said positive electrode and said negative electrode from both sides in said direction of superposition and houses therein said positive electrode, said separator, said negative electrode, and said electrolytic solution,
wherein said electrolytic solution contains:
an electrolytic solution material serving as a base compound; and
lithium difluoro(oxalato)borate and fluoroethylene carbonate serving as additives,
said electrolytic solution has a content of fluoroethylene carbonate that is equal to or less than a content of lithium difluoro(oxalato)borate, and
said electrolytic solution has a moisture content higher than or equal to 10 ppm by mass and lower than or equal to 15 ppm by mass.

2. The lithium secondary cell according to claim 1, wherein
said electrolytic solution has a content of said lithium difluoro(oxalato)borate higher than or equal to 0.1 percent by mass and lower than or equal to 4 percent by mass.

3. The lithium secondary cell according to claim 1, wherein
reaction resistance per unit reaction area is higher than or equal to 3.5 $\Omega \cdot cm^2$ and lower than or equal to 5.8 $\Omega \cdot cm^2$.

4. The lithium secondary cell according to claim 1, wherein
said positive electrode includes:
a sheet-like current collector having conductivity; and
an active material plate that is a plate-like ceramic sintered body containing a lithium composite oxide.

5. The lithium secondary cell according to claim 4, wherein
said active material plate has a structure in which primary particles having a layered rock-salt structure are coupled together,
said primary particles have an average inclination angle greater than 0° and less than or equal to 30°, and
said average inclination angle is an average value of angles formed by (003) planes of said primary particles and a main surface of said active material plate.

6. The lithium secondary cell according to claim 1, being used as a power supply source of a sheet-like device or a device having flexibility.

7. The lithium secondary cell according to claim 6, being used as a power supply source of a smart card that is said device having flexibility.

* * * * *